INVENTORS
RONALD WILLIAM LEWIS
ERIC SMITH
BY Cullen, Settle, Sloman & Cantor
ATTORNEYS

United States Patent Office 3,606,594
Patented Sept. 20, 1971

3,606,594
HERMETICALLY SEALED MOTOR/COMPRESSOR APPARATUS
Ronald William Lewis and Eric Smith, Bognor Regis, England, assignors to Lec Refrigeration Limited, Bognor Regis, England
Filed May 25, 1970, Ser. No. 40,314
Claims priority, application Great Britain, Aug. 27, 1969, 42,681/69
Int. Cl. F04b *17/00, 35/04*
U.S. Cl. 417—415
20 Claims

ABSTRACT OF THE DISCLOSURE

The present invention relates to hermetically sealed motor compressor apparatus and methods of assembling them, such apparatus being for instance used in the cooling systems of mechanical refrigerators. Apparatus according to the invention comprises a casing formed from at least two parts to contain a motor compressor with its resilient support, flexible refrigerant discharge pipe and electric connections. The parts register hermetically to embrace a plurality of pre-formed component members which are incorporated and housed therein in accordance with the method of the invention.

---

The invention refers to hermetically-sealed motor-compressor apparatus as used in the cooling systems of mechanical refrigerators, and is more particularly concerned with the form of structure of an internal framework for a motor-compressor, materials of which the said framework and said motor-compressor are made, and improved supporting means for suspending the said framework and said motor-compressor in a resilient manner in a hermetically sealed enclosure. The invention further embraces an improved reciprocating mechanism linking or yoking a crankshaft to a compressor piston.

An object of this invention is to provide a simple, inexpensive structure for a framework, a motor housing, a crankshaft, a main bearing, a link motion and a refrigerator compressor. Another object is to provide a link mechanism or reciprocating yoke which may be used with equal facility in a composite motor-compressor of the type to be described or in the hitherto usual monoblock type also referred to later. Another object is to provide a link mechanism or reciprocating yoke which can readily compensate for misalignment of components in any plane and so facilitate a projection-welded or bolted assembly, and which also can facilitate reconditioning with minimum dismantling. Another object is to provide a resilient suspension and supporting means for a motor-compressor assembly which yields improved radial damping of vibration under conditions of starting torque or stopping torque and so permits omission of suspension adjustment during assembly of motor-compressor to outer case. Another object is to provide an improved lubricating system for a link mechanism and piston member with a simultaneous cooling effect for the piston member and cylinder walls. Other objects will become evident from the subsequent description.

The improvements in construction summarized above enable essential components to be mass-produced by metal stamping or metal drawing operations, with the elimination of costly milling turning and drilling, and of costly tools, jigs and fixtures associated with these, thus simplifying and cheapening manufacturing and assembly operations.

Furthermore, certain components of the structure can be made common to a variety of sizes of motor-compressor apparatus of the form to be described, replacement of components is facilitated, and working noise from the complete motor-compressor is appreciably reduced from that experienced with mono-block constructions. Hitherto a customary construction for motor-compressor units has employed a relatively massive casting as a principal internal structure, often referred to as a monoblock construction, to which the motor stator is attached and which needs extensive machining to form a bearing for the crankshaft, to form the compressor cylinder block and to form a bed for the reciprocating link mechanism between the crankshaft and the compressor piston.

We have found that massive construction is not essential and we have been able to lighten it considerably by the extensive use of pre-formed components which may be individually made to such fine tolerances as are required and assembled with ease also to fine tolerances. In particular we have found that working parts may be made in sintered metal, especially sintered iron, which may be pre-formed to fine tolerances on critical dimensions, and require the minimum of subsequent machining. This material also, because of its naturally low sound transmission, deadens noise from working. We have also found that this lighter composite structure may be adequately yet flexibly supported against excessive vibrations and chatter during working by a deformable looped spring held in appropriate brackets on the internal structure and the outer casing.

According to the invention an improved hermetically-sealed motor compressor apparatus as used in the cooling systems of mechanical refrigerators comprises an outer casing in at least two parts to contain a motor-compressor with its resilient support, flexible refrigerant discharge pipe and electric connections, the two or more casing parts being designed to register exactly for hermetic sealing along the joint between them, a plurality of brackets attached to the internal wall of one of the two parts of the outer casing, a pre-formed continuous deformable internal supporting and suspension spring, a pre-formed motor stator housing, a motor stator attached to the said motor stator housing, a preformed main bearing attached to the said motor stator housing, a crankshaft to which is attached a motor rotor and which carries on one end a balance weight and a crankshaft eccentric, a pre-formed link mechanism or reciprocating yoke comprising a yoke big end embracing the crankshaft eccentric and a yoke little end comprising side arms attached to the yoke big end and having apertures at right angles to the axis of the yoke big end, a transverse slide shaft which passes through the said apertures in the side arms, a pre-formed piston member locked to the said slide shaft, and a pre-formed compressor cylinder block in which the piston member slides and which is closed by a valve plate and a cylinder head, the pre-formed compressor cylinder block being attached to the aforesaid motor stator housing and having formed in it a suction chamber and a discharge chamber, the latter adapted for the attachment of a refrigerant discharge pipe.

The invention also includes a method of assembling a hermetically-sealed motor-compressor apparatus as used in the cooling systems of mechanical refrigerators comprising the steps of mounting a plurality of brackets on the internal wall of one of the parts of the said outer casing, attaching to a pre-formed motor stator housing a pre-formed compressor cylinder block (with its associated valve, valve plate, cylinder head and flexible refrigerant discharge pipe) and a pre-formed main bearing, inserting a pre-formed piston member into the said compressor cylinder block, inserting a crank-shaft with its associated balance weight and crankshaft eccentric into the said main bearing from the top (such that the said crankshaft eccentric is adjacent the said piston member), attaching a preformed motor rotor member to the lower end of the said crankshaft remote from the said crankshaft eccentric, sliding a pre-formed yoke big end onto the said crankshaft eccentric with the associated yoke little end side arms pointing towards the cylinder block and straddling the protruding end of the piston member, inserting a slide shaft through one side arm, through the piston member and through the other side arm, inserting a locking pin through registering holes in the piston member and slide shaft, attaching a pre-formed motor stator to the lip flange of the said motor stator housing to co-operate with the said motor rotor member, completing the necessary electric connections, attaching a preformed continuous deformable internal supporting and suspension spring member to the said motor stator housing, attaching the deformable supporting and suspension spring member to the said fixed brackets on the internal wall of the outer casing, connecting the refrigerant discharge pipe approximately to an outside connection point, and affixing and hermetically sealing the other part(s) of the outer casing of the assembly.

The invention is further described with the aid of the accompanying drawings, which illustrate one embodiment by way of example only, and in which.

Figure 1:
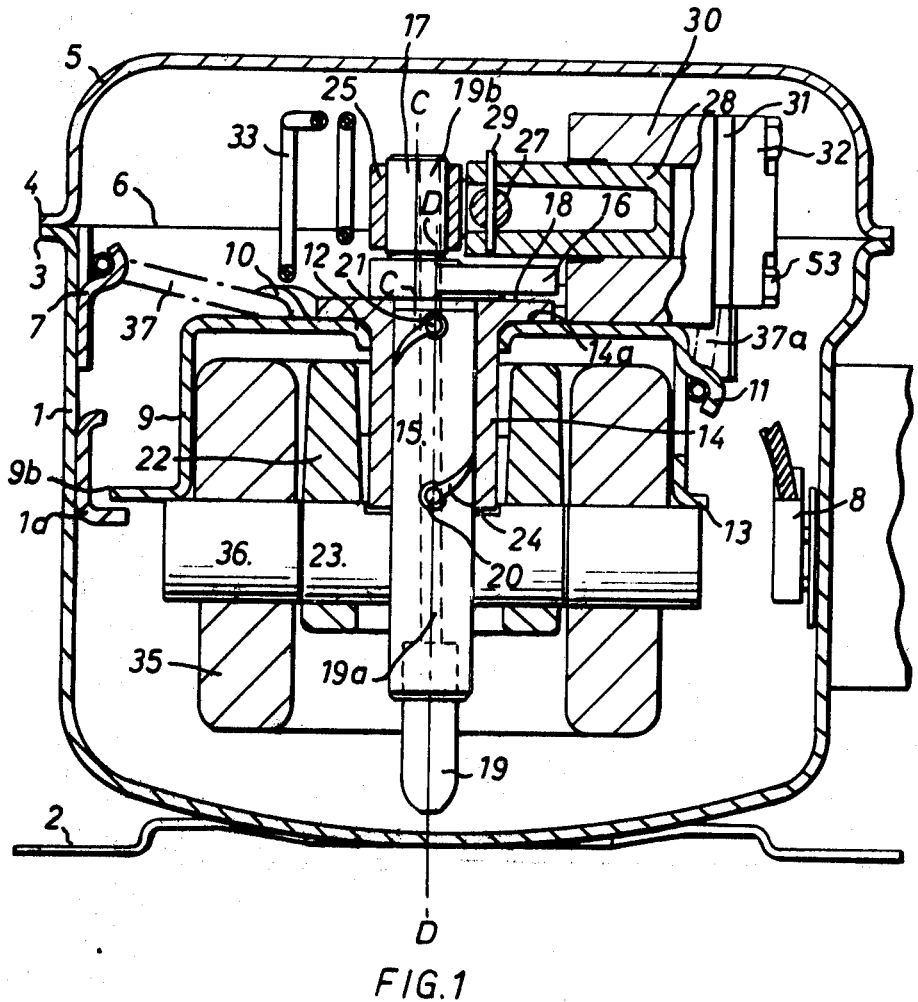
FIG. 1 is a vertical section through a hermetically-sealed electric motor-compressor with the electric connections omitted for clarity and the crankshaft shown in view.
Figure 2:
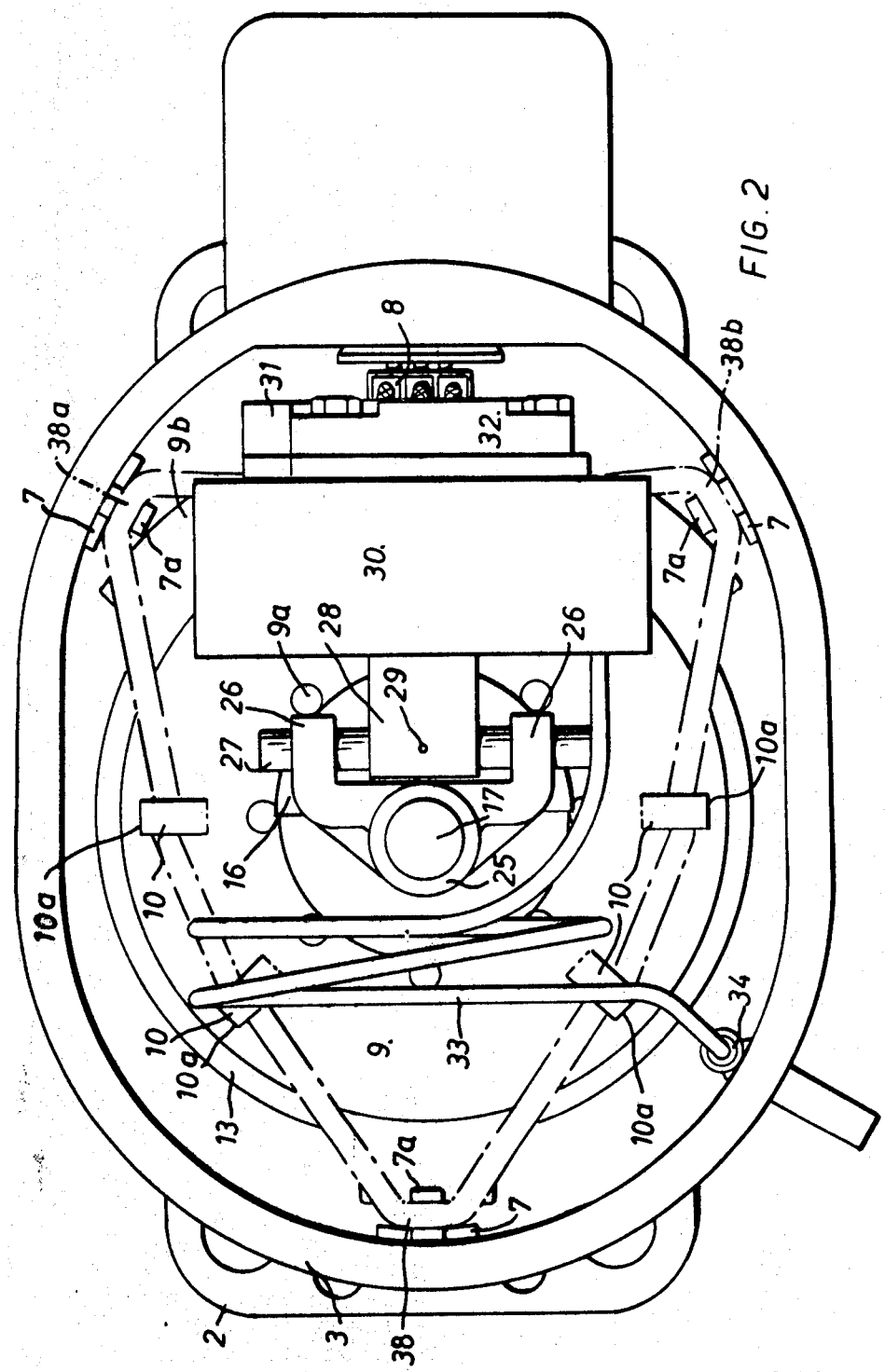
FIG. 2 is a plan view of a hermetically-sealed electric motor-compressor with the upper part of the outer casing removed.

A pre-formed lower outer casing member 1 with securing brackets 2 carries a flange 3 which co-operates with a flange 4 on a pre-formed upper outer casing member 5 such that the two casings are able to be hermetically-sealed along joint 6. Inside casing 1 a plurality, say three, of supporting brackets 7 is attached by e.g. projection welding at a level a little below flange 3. A plurality, say three, of C-brackets 1a is also attached to the inside of casing 1 by e.g. projection welding. Electric connections not otherwise shown in full are made to terminal 8 attached to casing 1.

Figure 6:
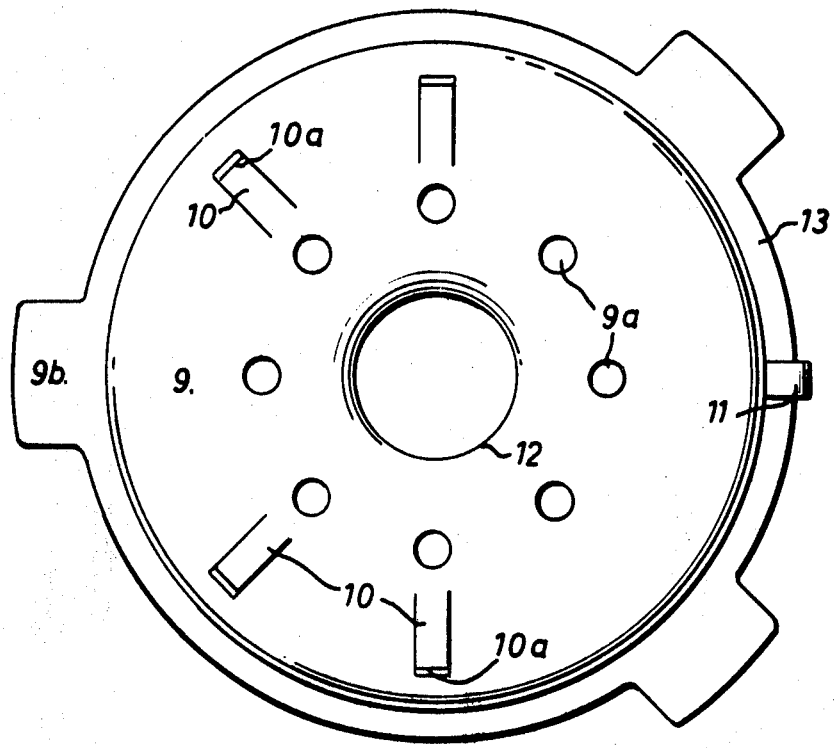
FIG. 6 is a plan view of a pre-formed motor stator housing.
Figure 7:
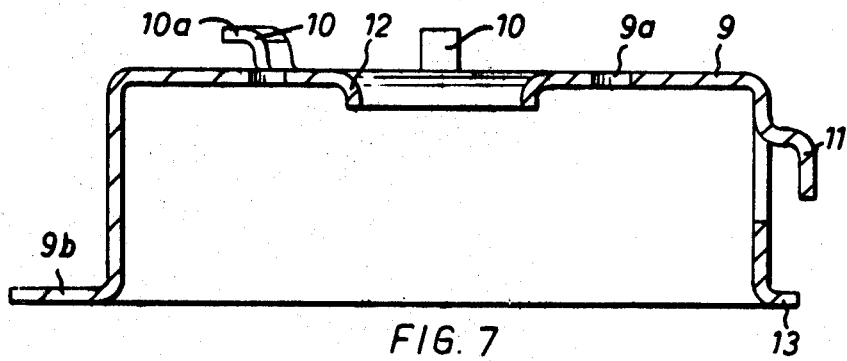
FIG. 7 is a sectional view of a pre-formed motor stator housing.

An inverted bowl-like motor stator housing 9 (FIGS. 6 and 7) is fabricated by e.g. pressing, stamping or drawing from sheet metal, preferably sheet steel. It is noted on the base as at 10, either during forming or subsequently, and the notched tongues are raised. A similar notched and raised tongue is provided as at 11 on one side of housing 9.

The lip of housing 9 is flanged outwardly as at 13 and carries a plurality, say three, projecting ear 9b. To flange 13 a motor stator member 35 is attached by welding or bolting the projecting edge of circular laminated core 36 to flange 13.

The centre base of housing 9 is pierced and plunged as at 12. Adjacent to piercing 12 a plurality of apertures 9a is provided. Through the plunged piercing 12 a pre-formed main bearing member 14 of a hollow mushroom-like form is inserted from above and is secured to housing 9 by e.g. welding or bolting. To assist welding three blips or studs are pre-formed on the face 14a mating with housing 9. Bearing 14 is pre-fabricated in sintered metal, preferably sintered iron. The external diameter of the shank of 14 is made to fit precisely and tightly into plunged piercing 12 prior to securing these two parts together. The accuracy and concentricity required here in relation to the walls of housing 9 are referred to later.

Main bearing 14 carries a cast crankshaft 15 which has formed on its upper end a balance weight 16 and a crankshaft eccentric 17. A dipper tube 19, made preferably in mild steel, is pressed tightly into the lower end of crankshaft 15. An axial bore 19a leads through dipper tube 19 and crankshaft 15 to radial bores 20, 21 connected by peripheral helical chase 24, and is adapted for feeding lubricant in known manner to main bearing 14.

To the lower end of crankshaft 15 an induction motor rotor 22 of known form is attached by e.g. shrinking on the rotor core laminations 23. The position of attachment of motor rotor 22 to crankshaft 15 is carefully pre-determined such that the top of laminations 23 (as seen in FIG. 1) lie just above the level of the top of motor stator laminations 36 in the final assembly. This ensures that in operation the horizontal mating faces 18 between crankshaft 15 and the top of main bearing 14 are pressed into close contact and that the top face of main bearing 14 acts as a thrust bearing due to the electrical urge downwards of motor rotor 22 resulting from the difference in levels described. As the clearance between stator laminations 36 and rotor laminations 23 must be initially small and must remain small during the whole working life of the motor, much depends upon the accuracy, concentricity and fine dimensional tolerances between main bearing 14 and crankshaft 15.

A pre-formed yoke big end 25 attached to two arms 26 (FIGS. 2, 3, 4, 5) sleeves over crankshaft eccentric 17. Yoke big end 25 and arms 26 are pre-fabricated in sintered metal, preferably sintered iron, to fine dimensional tolerances.

The two arms 26 carry transverse bores, of fine tolerance dimensions through which steel slide shaft 27 passes, the length of shaft 27 being such that arms 26 can slide along it in each direction to the full extent of the eccentricity of crankshaft 17 and still leave an adequate length exposed outside the arms at the extreme positions. This construction forms a yoke little end.

Shaft 27 passes through one end of hollow piston member 28, in which it is a close fit, and shaft 27 and piston member 28 are secured together by transverse steel locking pin 29 which passes through appropriate bores in shaft 27 and piston 28 as a drive fit. Piston 28 operates in the bore of cylinder block 30. Cylinder block 30 is attached to motor stator housing 9 by e.g. projection welding or bolting. The bores of cylinder block 30 are closed by valve plate 31 and cylinder head 32 bolted through intervening gaskets to cylinder block 30 in known manner. Cylinder block 30 carries a serpentine flexible refrigerant discharge pipe 33 appropriately attached to it by e.g. brazing.

Crankshaft eccentric 17 is a sliding fit on crankshaft 15 and arms 26 are adapted to slide along shaft 27. These parts provide a simple link mechanism or reciprocating yoke between crankshaft 15 and piston 28 whereby the rotary motion of the former is transformed into reciprocating motion for the latter in cylinder block 30.

Figure 8:
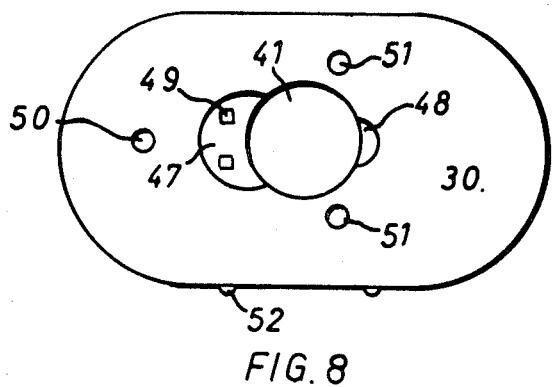
FIG. 8 is a plan view of a pre-formed compressor cylinder block showing the cylinder face (that is, the top surface of FIG. 9)
Figure 9:
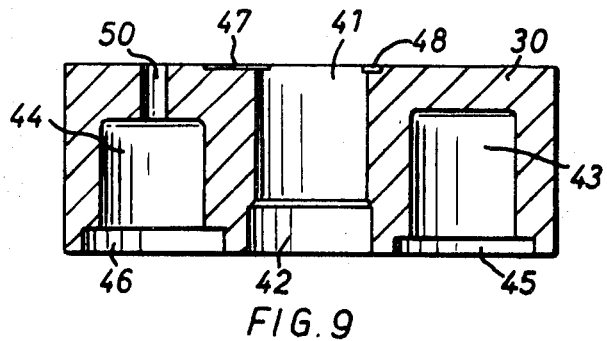
FIG. 9 is a sectional view of a pre-formed compressor cylinder block.
Figure 10:
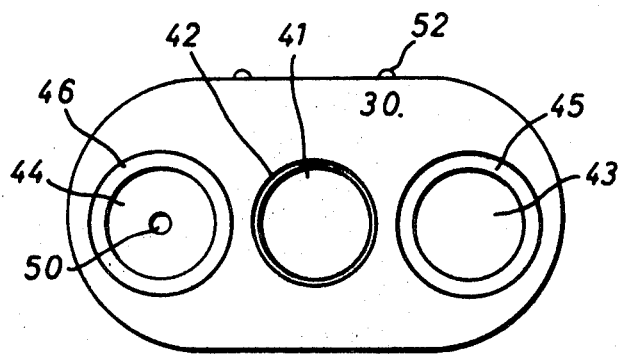
FIG. 10 is an underside plan view of a pre-formed compressor cylinder block (that is, the bottom surface of FIG. 9)

Piston member 28, cylinder block 30 and cylinder head 32 are each prefabricated in sintered metal, preferably sintered iron. In the case of cylinder block 30 advantage is taken of the properties of this material to preform not only cylinder bore 41 with its counter-bore 42 (FIGS. 8, 9 and 10) but also ancillary suction and discharge chambers 43, 44 with their respective counter-bores 45, 46, suction reed-valve recess 47, suction reed-valve nib recess 48, suction reed-valve peg holes 49, discharge cap securing hole 50 and discharge rivet clearance holes 51. To assist subsequent projection welding (when adopted) blips or studs 52 are provided on the base of cylinder block 30. Most of the foregoing features in monoblock construction would normally require machining from the solid, but in this improved component machining is required only for cylinder bore 41 and counter bores 45 and 46, while discharge cap securing hole 50 is thread-tapped. Drilling operations are confined to those for three small-diameter bores not shown, one from discharge chamber 44 and two from suction chamber 43, all to the top of cylinder block 30, and to four blind holes (not shown) for thread tapping to receive securing bolts 53 (FIG. 1) for valve plate 31 and cylinder head 32. One of the two holes in suction chamber 43 co-operates with holes in valve plate 31 and cylinder head 32 and serves as the inlet for refrigerant gas to the compressor in known manner.

It will be appreciated that cylinder block 30 is secured to motor stator housing 9 after these few machining operations have been completed, and that the appropriate closure fittings are then attached. These comprise a thin flat suction reed valve which fits in recess 47 with attached pegs which are guided in peg holes 49, a discharge cap which fits into counter-bore 46, and to which refrigerant discharge pipe 33 is attached by e.g. brazing, and is secured by a bolt or screw passing through cap and chamber 44 into tapped hole 50. Suction chamber 43 is closed by a closure disc or core plug pressed into counter-bore 45. Valve plate 31 and cylinder head 32 are secured through intervening gaskets by bolts 53.

Figure 3:
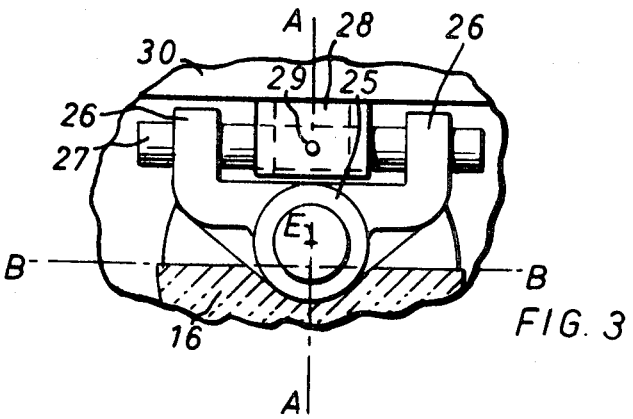
FIGS. 3, 4 and 5 are scrap plan views showing the improved link mechanism or reciprocating yoke at various stages of piston movement in the cylinder block.
Figure 4:
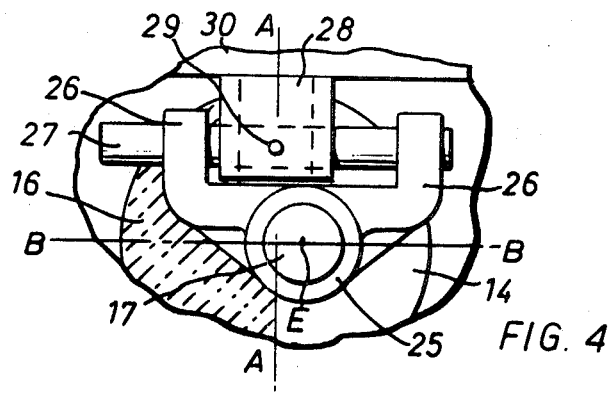
Figure 5:
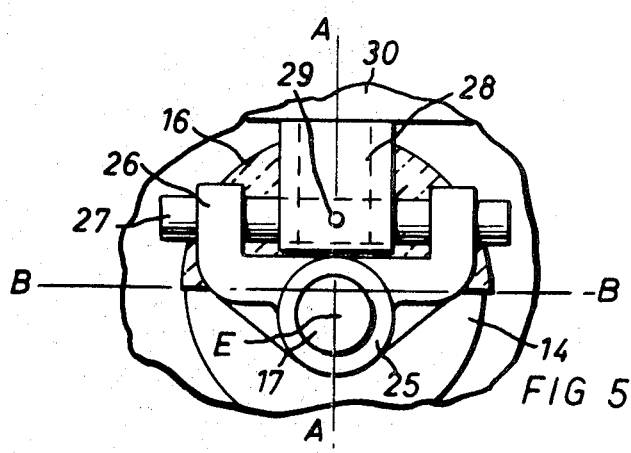

The mode of operation of crankshaft 17, link mechanism 25, 26 and 27, and piston 28 is illustrated in FIGS. 3, 4 and 5 which show three positions. In these figures the intersection of lines AA, BB indicates the axis of rotation of crankshaft 15. The eccentricity of crankshaft eccentric 17 in a horizontal plane is indicated by the distance between lines CC, DD in FIG. 1 and of point E from the aforesaid intersection of AA, BB in FIGS. 3, 4 and 5. In FIG. 3 piston 28 is at top dead centre and arms 26 are symmetrically disposed about piston 28 and shaft 27. In FIG. 4 crankshaft eccentric 17 is at 90° angle from top dead centre and yoke big end 25 has been carried the corresponding eccentric distance away from line AA, which has caused arms 26 to slide along shaft 27 and to draw piston 28 half way from the top of its compressive stroke. In FIG. 5 crankshaft eccentric 17 has completed a further 90° angular turn and has brought piston 28 to bottom dead centre and the end of its suction stroke, the link between crankshaft eccentric 17, yoke big end 25 and arms 26 having caused arms 26 to slide back along shaft 27 to a symmetrical position again. A further 90° angular turn (not shown) would cause arms 26 to slide along shaft 27 to the other side from that shown in FIG. 4, when piston 28 would be half-way in on its compression stroke.

As the link or yoke formed by yoke big end 25 and arms 26 is in effect floating in two horizontal planes at right angles within the limits imposed by the eccentricity of crankshaft eccentric 17 to crankshaft 15, and as crankshaft eccentric 17 with crankshaft 15 is free to rise slightly vertically, misalignments due to slight inaccuracies in assembly, e.g. poor projection welding of main bearing 14 to motor stator housing 9, are essentially self-corrected. This contributes to longer life of the hermetically sealed motor-compressor assembly.

Axial bore 19a is continued through the core of balance weight 16 and crankshaft eccentric 17 obliquely as at 19b (FIGS. 1, 11, 12, 13). Crankshaft eccentric 17 carries a radial bore 38 communicating with bore 19b. The outer end of bore 38 communicates with a shallow channel 39 cut at right-angles to the central axis for about seven-eighths of the periphery of crankshaft eccentric 17. Yoke big end 25 carries two radial bores 40 which start about midway along the bore 25 and rise at an angle such that their outer ends adjacent side arms 26 point to the top (viewed in elevation) of slide shaft 27 enters the inner sides of the transverse bores in which it slides. The positions of the inner ends of bores 40 adjacent channel 39 are such that in the assembled link mechanism channel 39 and bores 40 are in register and can communicate freely at the appropriate cycle phase.

The construction above described is adapted to provide pressure jet lubrication of slide shaft 27 and piston member 28. Rotation of crankshaft eccentric 17 in the direction of the arrow (FIG. 11) not only causes lubrication of main bearing 14 as already mentioned but also causes lubricant to be forced along bores 19b and 38 and into channel 39. As crankshaft eccentric 17 revolves slugs of lubricant are forced intermittently into bores 40 and are shot by centrifugal force towards the top of slide shaft 27, over the outside and into the inside of hollow piston member 28, and over cylinder block 30. The pressure jet spurting into the interior of piston member 28 serves to cool the internal wall of the piston member and assists materially in keeping cylinder wall temperatures down.

Figure 11:
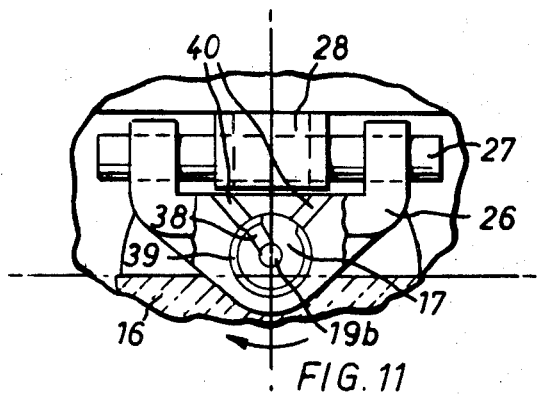
FIGS. 11, 12 and 13 are scrap plan views showing lubricant ducts in the improved link mechanism, in part section.
Figure 12:
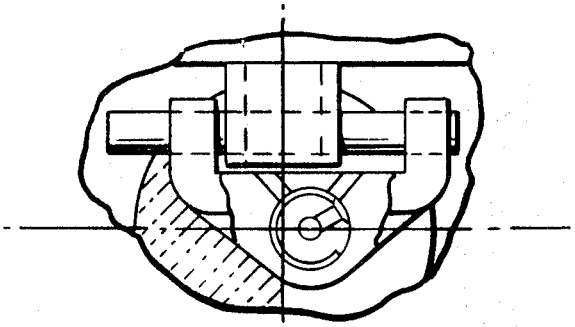
Figure 13:
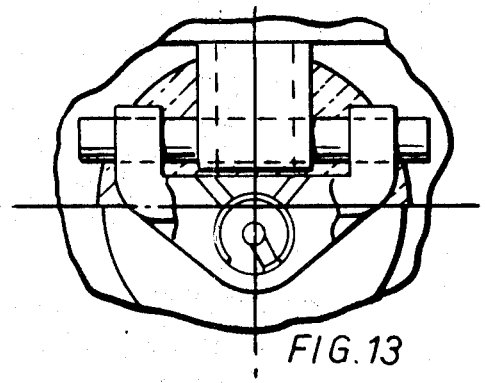

FIGS. 11, 12 and 13 indicate three positions in the rotary cycle and serve to show the sequence. In FIG. 11 piston member 28 is at top dead centre and channel 39 is just being connected to a first bore 40. Continuation of rotation by about one-eighth turn (FIG. 12) opens a second bore 40 of channel 39 so that now two lubricant jets are in operation, and so continue (as FIG. 13, which shows piston member 28 at bottom dead centre) until with further rotation the leading edge of channel 39 cuts off the first bore 40 for a short time and then the second bore 40 in turn. A series of spurts under pressure thus results.

Excess lubricant drains away. Some flows down the inner walls of the outer casing, but some also falls on motor stator housing 9 and drains through apertures 9a over rotor 22 and stator 35 to assist in cooling these latter.

The method of assembly of the above-described motor-compressor and casing falls into three parts:

(1) Assembly of outer casing.
(2) Assembly of internal structure of motor-compressor.
(3) Assembly of motor-compressor to outer casing.

The outer casing assembly comprises attaching brackets 7, C-brackets 1a and terminal 8 to casing 1 as will be evident from the earlier description of this part of the construction. The assembly of the internal structure of the motor-compressor follows essentially the description given of the construction, except that the attachment of motor stator 35 through its laminated core 36 to housing 9 occurs later on.

The sequence is:

Attach main bearing 14 to stator housing 9; attach cylinder block 30 to housing 9; insert piston 28 into cylinder block 30; insert crankshaft 15 into main bearing 14; attach rotor 22 by means of its laminated core 23 to shaft 15; sleeve yoke big end 25 over crankshaft eccentric 17 with arms 26 straddling piston 28; insert slide shaft 27 through one arm 26, through piston 28; and then through the other arm 26; insert locking pin 29 to secure piston 28 to shaft 27; attach laminated core 36 with stator coil 35 to flange 13 by means of the projecting edge of laminated core 36 (this may call for a guidance jig to preserve concentricity with rotor laminations 23); attach refrigerant discharge pipe 33; attach electric leads to appropriate adapter to co-operate with terminal 8.

In order to suspend the foregoing internal structural assembly in a flexible manner inside outer casing 1 as is requisite for adequate radial damping in order to avoid excessive vibration and chatter during working, and especially during starting and stopping, stator housing 9 is hung on brackets 7 through the intermediary of a preformed continuous deformable internal supporting and suspension spring support 37 comprised of a length of spring steel wire formed into a tight small-diameter helix with the ends joined to form a loop in conventional manner by use of a screwed-in link of helical coiled wire of outside diameter slightly greater than the internal diameter of the spring support helix. The length of suspension spring support 37 is predetermined such that it will fit under tension in brackets 7 on the outer casing and under tongues 10, 11 on motor stator housing 9. The order of assembly is first to attach support 37 under tongue 11, clench the end of tongue 11 over to trap the helical coil, then to loop 37 under tongues 10 and clench the ends 10a over to trap the helical coil. The electric connection at 8 is now completed after the motor-compressor inner assembly has been skewed and twisted inside lower outer casing 1 in order to locate ears 9b between the ends of C-brackets 1a. The co-operation of ears 9b with C-brackets 1a provides a stop against excessive vertical movement during working in known manner. Appropriate free portions of spring support 37 are stretched over brackets 7 on the outer casing, the ends 7a of these brackets then being clenched over to trap the helical coil of 37. Last of all the free end of refrigerant discharge pipe 33 will be suitably attached by e.g. brazing to connection 34. Top casing 5 may then be hermetically sealed to lower outer casing 1 along joint 6. At a convenient subsequent time lubricant is introduced into lower outer casing 1 through either of two nozzles (not shown) on upper outer casing 5 which also serve to introduce suction return gas from the evaporator by conventional means during working.

Minor details may be amended or altered, or the order of assembly changed within the scope of the invention; in particular the order of attachment of valve plate 31, cylinder head 32 or refrigerant discharge pipe 33 may be changed.

The use of individual components made of dissimilar materials in the structural assembly lightens constructions and facilitates replacement of individual components when needed. The extensive use of sintered metal assists precision prefabrication, for articles manufactured in this material can be made to very close dimension tolerances with the minimum need for further machining and only final honing in the most precise situations. The use of sintered metal also minimises mechanical noise transmission during working, for the material by its nature has sound-absorbent properties.

Sintered metal tends to be porous. To avoid the possibility of leakage under pressure from those parts subjected to high pressure, components manufactured in sintered iron, before final machining or honing to size, are subjected to a steam atmosphere which seals the pores.

What is claimed is:

1. Hermetically sealed motor compressor apparatus e.g. for use in the cooling system of a mechanical refrigerator, including:

an outer casing for a motor compressor, resilient support therefor, flexible refrigerant discharge pipe and electric connections, wherein said outer casing is in at least two parts registerable for hermetic sealing and further including:
 a plurality of brackets attached to the internal wall of one of the said parts,
 a preformed deformable internal supporting and suspension spring,
 a preformed motor stator housing,
 a motor stator attached to the said housing,
 a preformed main bearing attached to the said housing,
 a crankshaft and a motor rotor attached to said crankshaft,
 a balance weight and crankshaft eccentric carried at one end of said crankshaft,
 a preformed link mechanism comprising a yoke big end embracing the said crankshaft eccentric and a yoke little end comprising side arms attached to the said yoke big end and having formed therein apertures at right-angles to the axis of the said yoke big end,
 a transverse slide shaft which passes through the said apertures in the said side arms,
 a preformed piston member locked to the said slide shaft, and
 a preformed compressor cylinder block in which the said piston member slides and which is closed by a valve plate and cylinder head;
the said preformed compressor cylinder block being attached to the said motor stator housing and having formed in it a suction chamber and discharge chamber, the said discharge chamber being adapted for attachment to a refrigerant discharge pipe.

2. Apparatus as defined in claim 1 wherein the said motor stator housing is formed in sheet metal.

3. Apparatus as defined in claim 1 wherein the said motor stator housing has notched and raised tongues formed thereon.

4. Apparatus as defined in claim 1 wherein the said motor stator housing has a pierced and plunged aperture formed therein.

5. Apparatus as defined in claim 1 wherein the said motor stator housing has a flanged lip.

6. Apparatus as defined in claim 1 wherein the said motor stator housing carries perforations adapted for lubricant drainage to the interior.

7. Apparatus as defined in claim 1 wherein the preformed main bearing is prefabricated in sintered metal e.g. steam-sealed iron.

8. Apparatus as defined in claim 1 wherein the preformed main bearing carries preformed projection welding studs.

9. Apparatus as defined in claim 1 wherein the preformed piston member is prefabricated in sintered metal e.g. steam-sealed iron.

10. Apparatus as defined in claim 1 wherein the preformed cylinder block is prefabricated in sintered metal e.g. steam-sealed iron.

11. Apparatus as defined in claim 10 wherein the preformed cylinder block has formed therein a suction chamber, a discharge chamber, a piston bore, recesses for a valve, guide-holes for a valve, counter bores for closure discs on suction and discharge members, a counter bore for the piston bore and a discharge cap securing hole.

12. Apparatus as defined in claim 1 wherein the link mechanism is comprised substantially of sintered metal e.g. steam-sealed iron.

13. Apparatus as defined in claim 1 wherein the link mechanism comprises a preformed yoke big end which sleeves on the crankshaft eccentric attached to the balance weight and side arms which form a said yoke little end adapted to slide on the slide shaft locked to the piston member.

14. Apparatus as defined in claim 13 wherein the said preformed crankshaft eccentric, balance weight and yoke little end have lubricant conduits preformed therein.

15. Apparatus as defined in claim 14 wherein the preformed hollow piston member is pressure jet lubricated from the link mechanism during working and by such pressure jet lubrication is also internally cooled.

16. Apparatus as defined in claim 1 wherein the preformed continuous deformable internal supporting and suspension spring comprises a length of spring wire wound into a close helix of small diameter with the ends of the helix joined together to form a continuous loop.

17. Apparatus as defined in claim 16 wherein the said loop is clipped under tension into brackets secured to the interior of the outer casing.

18. Apparatus as defined in claim 16 wherein the said loop is clipped under notched and raised tongues.

19. Apparatus as defined in claim 5 wherein the motor stator is attached through its associated core laminations to a preformed flange on the periphery of the preformed motor stator housing.

20. A method of assembling a hermetically sealed motor compressor apparatus e.g. for use in the cooling system of a mechanical refrigerator, which apparatus comprises an outer casing in at least two parts in which a motor compressor is mounted, the said method comprising the steps of—
- (A) mounting a plurality of brackets on the internal wall of one of the parts of the said outer housing,
- (B) attaching to a preformed motor stator housing a preformed compressor cylinder block and a preformed main bearing,
- (C) inserting a preformed piston member into the said compressor cylinder block,
- (D) inserting a crankshaft with its associated balance weight and crankshaft eccentric into the said main bearing from the top such that the eccentric is adjacent the piston member,
- (E) attaching a preformed motor rotor member at the lower end of the said crankshaft remote from the said crankshaft eccentric,
- (F) sliding a preformed yoke big end onto the said crankshaft eccentric with associated yoke little end side arms pointing towards a cylinder block and straddling the protruding end of the piston member,
- (G) inserting a slide shaft through one side arm, through the piston member and through the other side arm,
- (H) inserting a locking pin through registering holes in the piston member and slide shaft,
- (I) attaching a preformed motor stator to the lip flange of the said motor stator housing to co-operate with the said motor rotor member,
- (J) completing the necessary electric connections,
- (K) attaching a preformed deformable internal supporting and suspension spring member to the said motor stator housing,
- (L) attaching the deformable supporting and suspension member to said fixed brackets on the internal wall of the outer casing,
- (M) connecting a refrigerant discharge pipe appropriately to an outside connection point, and
- (N) affixing and hermetically sealing the remainder of the said outer casing of the assembly.

References Cited
UNITED STATES PATENTS

| | | | |
|---|---|---|---|
| 1,801,395 | 4/1931 | Summers | 417—539XR |
| 2,628,765 | 2/1953 | Anderson | 417—419 |

ROBERT M. WALKER, Primary Examiner

U.S. Cl. X.R.

417—902